W. N. SPRINGER.
TRACTOR FOR FARM IMPLEMENTS.
APPLICATION FILED JULY 25, 1916. RENEWED FEB. 21, 1920.

1,355,178.

Patented Oct. 12, 1920.

WITNESS
Floyd R. Cornwall

INVENTOR
W. N. Springer
BY
ATTORNEY

W. N. SPRINGER.
TRACTOR FOR FARM IMPLEMENTS.
APPLICATION FILED JULY 25, 1916. RENEWED FEB. 21, 1920.

1,355,178.

Patented Oct. 12, 1920.
3 SHEETS—SHEET 2.

UNITED STATES PATENT OFFICE.

WILLIAM N. SPRINGER, OF PEORIA, ILLINOIS.

TRACTOR FOR FARM IMPLEMENTS.

1,355,178.     Specification of Letters Patent.     Patented Oct. 12, 1920.

Application filed July 25, 1916, Serial No. 111,213. Renewed February 21, 1920. Serial No. 360,338.

*To all whom it may concern:*

Be it known that I, WILLIAM N. SPRINGER, a citizen of the United States, residing at Peoria, in the county of Peoria and State of Illinois, have invented certain new and useful Improvements in Tractors for Farm Implements, of which the following is a specification, reference being had therein to the accompanying drawing.

The invention relates to tractors especially adapted for use in connection with soil working implements, though in its broader aspects it is not limited to such uses.

The objects of the invention are to provide a strong and durable apparatus having its frame work constructed and arranged to support the motor parts in an elevated position so that the machine can be used with soil working tools in cultivating plants that have grown to a considerable height; to provide a machine having ample traction power which will not pack the earth but can be used upon light soil and leave it open and porous; and to provide a tractor which can be turned in a short radius and which is delicately and quickly responsive in steering so that it is adapted, when used for tillage purposes, to closely follow the irregularities of a row of plants and also to maintain its course while working on side hills.

Fig. 2 is a rear elevation of the same, the tools being omitted;

Figure 1:
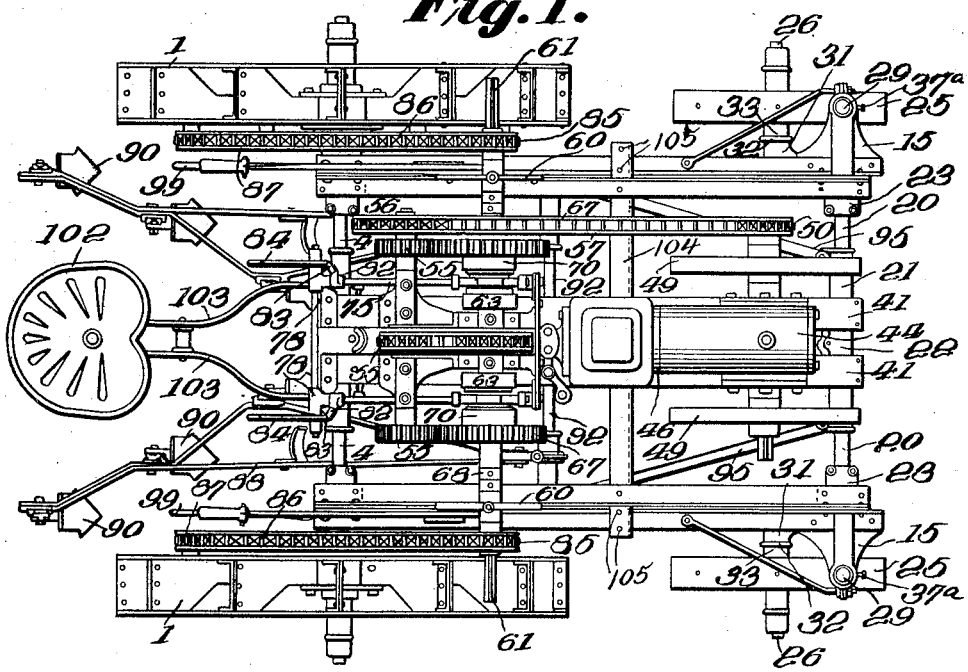
Figure 1 is a plan view of a machine embodying my improvements.
Figure 3:
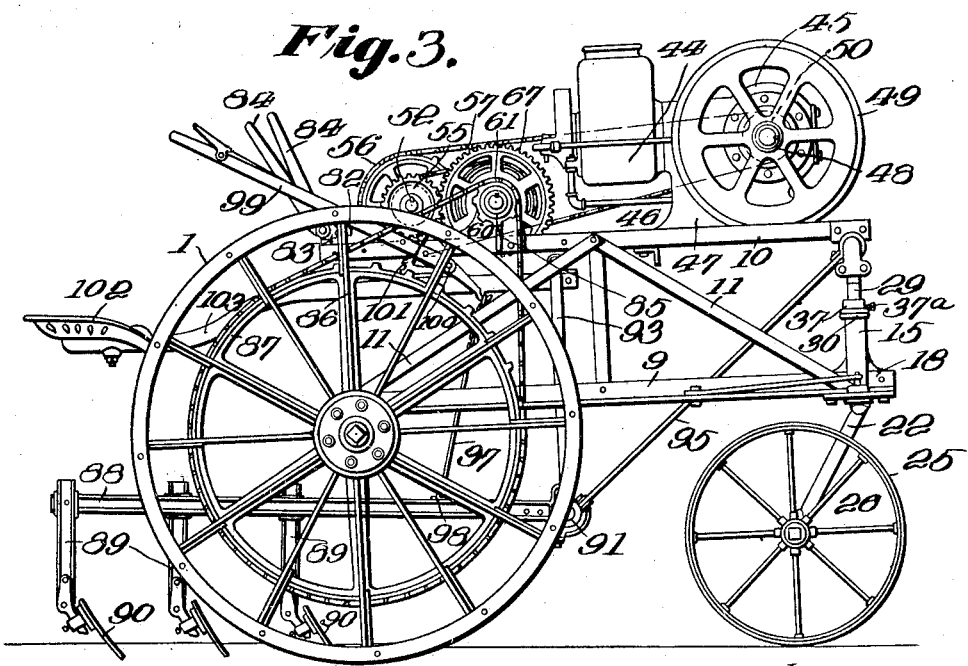
Fig. 3 is a side elevation.
Figure 4:
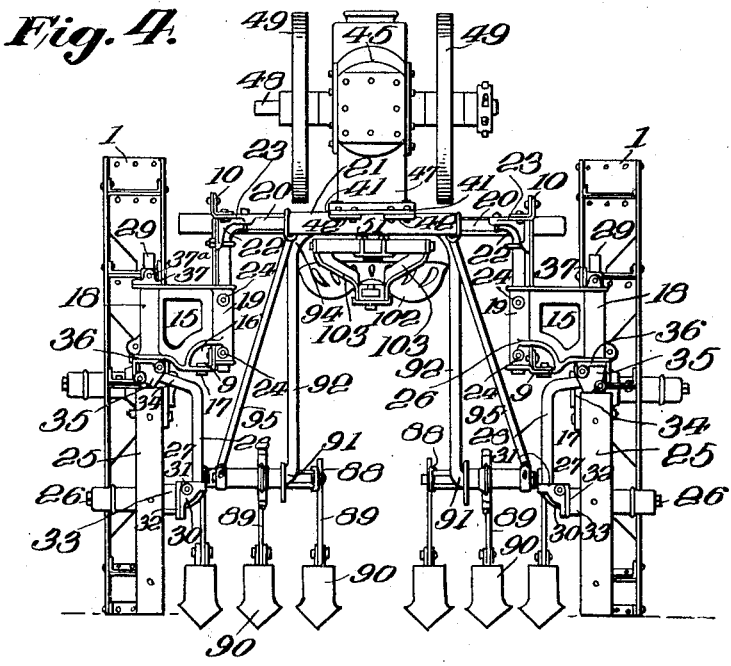
Fig. 4 is a front elevation.
Figure 5:
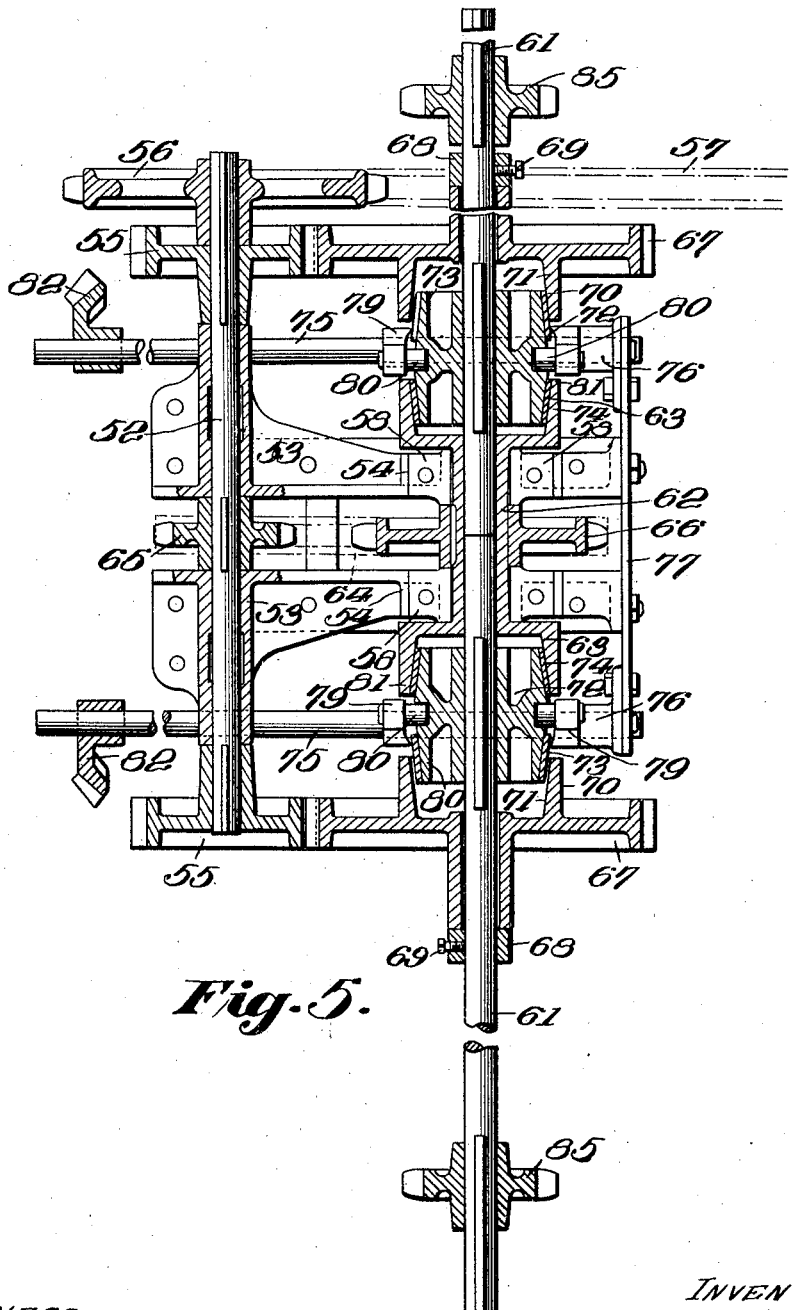
Fig. 5 is a section of the devices for transmitting power for reversing, steering, etc.

In the drawings, 1, 1 indicate the rear wheels which, as will be described, not only support the rear end of the mechanism but also are used for traction or driving purposes.

Each is mounted upon the spindle part 2 of a two-part axle 3, this having the upper horizontal parts 4 and the vertically arranged parts 5 each with bends at 6 and 7.

On this wheel frame is supported the part of the frame structure. It comprises two side frame elements 8, 8, each having a longitudinal sill 9, and an upper longitudinal sill 10, together with brace bars 11, 11. The rear end of each bottom sill is secured to the bend 6 of the adjacent axle section by means of a bracket 12 which is fastened to the axle by clip bolts 13. This bracket 12 is formed with a seat having sides at right angles to each other, and in this is seated the rear end of the sill 9 which is fastened by bolts 14.

At the front end the sill 9 is fitted in a bracket 15 which has an aperture 16 (to receive the end of the sill) and flanges at 9 for the fastening bolt 17. The bracket 15 lies in transverse planes, and has two tubular sockets 18 and 19.

At the front of the machine there is an arch 20 formed in two sections. These are adjustably (transversely of the machine) secured in a tubular part 21. Each has a bend at 22 and to it, at the bend, there is secured a bracket 23. The lower part of the leg of the arch bar is seated in the tubular socket 19 of the bracket 15 and is permanently clamped therein by set screws at 24.

25, 25 indicate the front wheels. Each is mounted on the spindle part 26 of a castering carrier 27 preferably formed from a piece of rod metal bent to provide the spindle 26, the rearward inclined arm 28 and a vertical spindle part 29. The latter spindle is mounted in the tube socket 18 of the bracket 15. At the bend 30 in this caster arm there is a bracket 31 with apertured ears through which the spindle rod passes and with a square surface at 32 to furnish an abutment bearing for the wheel hub 33. At the upper bend 34 there is a bracket 35 with a passage for the bent part of the caster arm and with a square shoulder at 36 upon which rests the flanged lower end of the tube 18 and the bracket 15. 37 is a collar with a set screw 37ª fastened to that part of the vertical spindle 29 which projects above the bracket 15 and holds the spindle 29 firmly in its bearing.

The upper longitudinal sill 10 of the framework is at the front end secured in a seat on the front bracket 23, this sill bar like the lower one at 9 being I-shaped. At its rear end it is fitted to a bracket casting 38 which, by U-bolts 39, is clamped to the upper bend 22 in the axle section.

40 indicates a tube horizontally arranged and adapted to receive the upper parts 4 of the crank axle sections. These can be laterally adjusted therein and secured at any desired position. 41, 41 indicate two longitudinal flat bars or plates which extend from the tube 21 of the front arch to the tube 40 of the axle, the former tube being provided with flanges 42, and the latter with flanges 43 to which these bars are bolted. Upon the front parts of these bars 41, 41 is mounted the engine. It is of the internal combustion class, comprising the cylinder 44, the crank case 45, the housing 46, the base 47, the crank shaft 48, the fly wheels 49, and the prime pinion 50. The base is formed with flanges 51 by which the engine is detachably bolted to the bars or plates 41, 41.

The power transmitting system comprises the following shafts, gears and mountings. 52 is a jack shaft mounted in bearings 53, 53 in the central brackets 54, 54 rising from and bolted to the rear ends of the upper longitudinal frame bars or plates 41, 41. It projects beyond the bearings and carries rigidly fixed thereon two spur pinions 55, 55, and also a sprocket gear 56. It receives power from the engine shaft 48 by the chain 57 connecting the prime pinion 50 with said sprocket 56.

This shaft 52 is connected to a countershaft 57, also arranged transversely, on lines between the jack shaft and the engine. It is mounted in bearings 58, 58 in the aforesaid central brackets 54, and is also supported in bearings 59, 59, carried by brackets 60, 60 which are bolted to and rise from the top frame sills 10. This counter shaft is in two sections 61, 61, which can be rotated together and in the same direction, or can be rotated independently or in opposite directions.

62 is a tubular shaft or sleeve in which the inner ends of the shaft sections 61, 61 are fitted in such way as to be loose and independently movable therein. This hollow shaft or sleeve 62 rests on the bearings 58, and carries the two cup elements 63, 63 of cone friction clutches.

It receives power from the jack shaft 52 by the chain 64 which engages with the driving sprocket pinion 65 on the shaft 52 and also engages with and drives the sprocket 66 on the hollow shaft 62. This sprocket wheel 66 is situated between the brackets 58, 58.

Each of the spur pinions 55 engages with a spur wheel 67 mounted loosely on the counter shaft 57 (or on one of the sections 61).

Each shaft section 61 has one or more spacing collars 68 held by set screws 69 and interposed between the hub of the wheel 67 and the bearing 59, these insuring that the shaft sections shall be held rigidly axially against displacement. Each of these spur wheels 67 has a hollow hub 70 with a friction cone surface at 71.

72, 72 indicate cone friction elements each being formed with two cone sections 73 and 74, one adapted to engage with the friction cup 63 on the hollow shaft 62 and the other adapted to engage with the cone socket 71 in the hub 70 of the wheel 67.

These clutch elements 72, 72 are splined to the counter shaft and are adapted to slide thereon in either direction. Each is moved by a rocking clutch shaft 75 which is mounted in a front bearing 76 carried by a bar 77, secured to the central brackets 54, and at its rear in a bearing 78 carrried by a bracket secured to the rear tube 40 at the upper part of the wheel frame. This rock shaft also has arms 79 which carry shifting pins 80 that are seated in the groove 81 in the sliding element of the friction clutch. Each rock shaft 75 has a pinion or segment gear 82. With this engages a segment gear 83 carried by a lever 84. When the lever is thrown in one direction the sliding clutch element is moved to engage with the wheel 67; and when it is moved in the opposite direction the cone engages with the cup 63.

The counter shaft is also provided with two sprocket pinions 85, 85. Each of these transmits power to a ground wheel 1 by means of a chain 86 engaging with a large sprocket wheel 87 secured to the inner faces of the wheel spokes, or otherwise made rigid with the ground wheels.

The structure composed of the parts above described is shown as being provided with two gangs of cultivating devices. Each gang has a drag bar 88 provided with standards 89, 89, and shovels or hoes at 90. The drag bar is mounted upon the spindle 91 of an arch bar 92 having two of the spindles 91, the vertical legs 93 and the cross central part 94. The latter is supported upon that part of the apparatus which carries the driver's seat. The spindles are provided with collars near their outer ends, and these are connected by brace rods 95 with flanges or ears 96 on the central tube 21 of the front wheel arch.

Each drag bar is connected to its spindle 91 by a pipe union which provides free swinging of the gang and the shovels laterally, and also permits them to be lifted with a rocking movement. 97 is a link extending upward from a pivot bracket 98 on the gang bar and loosely connected to the lower end of the control lever 99 which is pivoted at 100 to a bracket carried by the upper sill bar 10 and held in place by a detent and segment at 101.

102 indicates the driver's seat, which is carried by the bifurcated bar 103 which is suitably supported from the frame of the machine.

As will be seen, the machine is self-propelling, is provided with a centrally arranged motor, which is in an elevated horizontal plane, so that the machine can be used in the cultivation of plants of considerable height. The parts are so arranged that the weight of the driver and the weights of the engine parts are approximately counter-balanced around the axis of the rear wheels so that the greatest traction efficiency is insured.

The counter shaft is connected to the jack shaft by three trains of gear, one being the chain and sprocket gear at the center and the others being the spur gear connections at the sides.

The sprocket gear 65—66 is continuously driving the counter shaft 57 in one direction. When the operator, by the levers 84, throws both the cones 72 into engagement with the friction cups 63, the machine advances rectilineally forward, the power passing from the chain 64 and sprocket wheel 66 to the hollow shaft 62 and friction cups 63, thence to the sliding cones 72, to the counter shaft, and both of the sprocket pinions 85 are turned with equal speed and in the same direction.

When on the other hand, the operator, by the shifting rock shaft, throws both the cones 72, 72 outwardly and engages them with the spur wheels 67, 67 the central sprocket gear becomes inactive and the trains of spur gear simultaneously rotate the sections 61, 61 of the counter shaft with equal speeds, but in a direction reverse to that above described, so that the ground wheels 1, 1 are reversed and the machine moves backward.

Again, if the operator, by lever 84, throws the cone 74 inward and at the same time holds the left hand cone in the neutral position, the left hand ground wheel will be inactive and the right hand wheel will effect a turning of the machine toward the left. The caster wheels accommodate themselves to any of the directions in which the machine is propelled by the different manipulations of the power transmitting part.

If the driver, while having the right hand sliding clutch element engaged with its inner cup element 63, the same time throws the left hand clutch element outward toward its spur wheel 67, the right hand ground wheel will rotate forward while the left hand wheel rotates backward and a much more rapid turning of the machine as a whole is effected.

And by reversing the action of the clutches he can throw the machine toward the right either slowly or rapidly, as he desires.

A machine constructed in this manner can be used to great advantage for tillage purposes inasmuch as rows of plants can be followed closely, the tools can be guided to or from the rows, deflections of the rows from straight lines can be accurately followed, and the machine can be closely controlled on slopes or hill sides.

The engine is detachable from the tractor frame and can be made ready for other uses in a few moments. I have found that an engine of small size and weight is sufficient for a tillage implement, one capable of developing from one to two horse power being sufficient for the purpose when the parts are constructed and arranged in the way described.

In order to strengthen the upper part of the frame immediately below the engine I prefer to employ the cross girt 104, which can be bolted to the top sills 10, this girt having a series of bolt apertures 105, 105 to permit lateral adjustments.

The width covered by the machine can be varied as the upper parts 4 of the crank axle for the wheels can be adjusted inward or outward in the tube 40 as can also the upper parts of the front wheel arch in the front tube 21.

The drive wheels 1 are made in a way which specially fits them for tillage use. They are constructed so as not to pack the ground and yet provide strong traction. Each is formed with a hub 106 having the flange 107 on the outer side and the flange 108 on the inner. To these flanges are secured the inner ends of spoke plates 109, each of these plates having a narrower inner end part 110 and a wider part 111. 112, 112 are angle clips having a central part 113 which is firmly bolted to the outer end of the spoke plate, and having also the shorter ear parts or flanges 114, 114 which are bolted to peripheral rings 115, 115. The spoke plates are arranged comparatively closely together so that there shall always be a sufficient part of the wheel resting on the ground to prevent its sinking deeply; at the same time the periphery of the wheel is largely open to permit the spoke plates to enter the ground sufficiently to insure a firm traction grip at the end parts of the spoke, the disturbing of the earth by the spoke plates serving as part of the cultivating work, and the openness of the peripheral parts of the wheel preventing packing, and permitting the dropping of the earth picked up.

The machine may be regarded as comprising a rear wheel frame, a front wheel frame, a main central frame, and two side frames. Each side frame and the corresponding side parts of each wheel frame are adjustable outward and inward, the central main frame remaining relatively fixed in position. And upon this central main frame the power transmitting parts are all fixed, axially, even the two-part counter shaft, the only adjustable parts required in this part of the mechanism being the sprocket pinion 85.

I have shown and described my improvements in connection with soil working tools but it will now be apparent that the tractor can be used advantageously for other purposes under conditions such as are found on farms; the provision for adjustment of width of tread, and the flexibility of the driving and steering by virtue of the peculiar transmission, are features which render the machine especially useful under the conditions referred to.

The arranging of the driver's seat behind the axis of the drive wheels and in such way as to counterbalance more or less of the weight in front of that axis, makes all of the weight available for increasing the traction of the drive wheels. Moreover, it tends to make these, as pivot wheels, more readily responsive to turning forces, and the opposite end of the frame, the forward end, swings the more readily to the left or the right because of this counterbalancing.

I am aware that it has been proposed to employ manually turned steering wheels at the front end of a self-propelled implement frame, and one or more power driven wheels at the rear end. But in all earlier machines known to me, the driver's seat has been so arranged that the weight of the driver has been distributed over all the wheels interposed between the frame and the ground. In the present machine the weights of the driver, the frame, and even of the supplemental rolling supports for the frame (in this case, the caster wheels), are all brought to bear on the drive wheels with a tendency to lift the supplemental rolling support from the ground, this insuring that the desired lateral motions of the frame will be more readily and quickly accomplished. The resistance exerted by the ground against the lateral movements of such rolling supports as caster wheels is reduced to an extent corresponding to amount of weight tending to swing downward the rear end of the frame behind the axis of the main wheels.

It will be also observed that the earth-working tools are arranged approximately in the transversely vertical planes of the steering wheels, and as the driver is positioned close to the steering wheels and to the tool gangs, he can continuously direct his sight toward the plants at points immediately in front of him, and can cause the tools to quickly swing closer to, or farther from, the plants with accuracy and delicacy of movement. He is relieved of all occasion to look ahead, as is the case when driving a team of horses. The end of the machine, which is opposite to the end where the steering wheels are carried, will take care of itself without any attention from the driver, being held on rolling ground supports, such as the caster wheels, which serve as a pivotal support.

With his hands, or with well-known foot lever systems, he can control the levers which effect the steering without withdrawing his sight from the ground immediately in front of him. His undivided attention is given to watching the positions of the tools relatively to the plants, the machine, as an entirety, itself, taking care of its movements, in correspondence with which the tool gang couplers moved to the right or to the left as they are thrown by the movements of the steering wheels.

What I claim is:—

1. In apparatus of the character set forth, the combination of an upper central frame, rear driving ground wheels, front castering wheels, laterally adjustable side frames connected to the central frame and each carrying a front wheel and a rear wheel, an engine on the central frame, and transmission mechanism between the engine and the driving wheels mounted on the said central frame.

2. In apparatus of the character set forth, the combination of an upper central frame, rear driving ground wheels, front castering wheels, laterally adjustable side frames each carrying a front wheel and a rear wheel, an engine on main central frame, and the transmission shafting and gearing on said central frame comprising means for driving the rear wheels simultaneously and in either direction or for driving them independently and in opposite directions.

3. In apparatus of the character set forth, the combination of an upper central frame, rear traction and steering wheels, front castering wheels, laterally adjustable side frames each carrying a rear wheel and a front wheel, an engine and transmission gearing on the upper central frame and in front of the vertical plane of the axis of the rear wheels, and the driver's seat in rear of the said plane and arranged to have the weight of the driver partially counterbalance that of the transmission gear and the engine.

4. In apparatus of the character set forth, the combination of a main central frame, rear wheels supported upon an arched frame extending down from the central frame, the front castering wheels supported by an arch extending down from the front end of the said central frame, relatively wide side frames connected to the said upper central frame and to the spindle parts of the arch frames, an engine on the upper central frame, a counter shaft formed in two sections respectively connected to the rear ground wheels, driving devices for the counter shaft comprising parts for driving both sections simultaneously in the same direction, and parts for driving the sections independently of each other and in opposite directions.

5. In apparatus of the character set forth, the combination of an upper central frame, rear driving ground wheels, front castering wheels, laterally adjustable side frames each carrying a front wheel and a rear wheel, an engine on the main central frame, and transmission mechanism between the engine and the two driving wheels comprising a sectional transverse shaft mounted on the central frame, sprocket wheels adjustable outward and inward on said sectional shaft, sprocket wheels carried by the driving wheels and arranged to aline with the first mentioned sprocket wheels and a sprocket chain connecting the sprocket wheels on the sectional shaft with the sprocket wheels on the driving wheels.

6. In apparatus of the character set forth, the combination of a main frame, means comprising two driving wheels for supporting the frame from the ground, an engine on the main frame and driving connections between the engine and driving wheels comprising a transverse jack shaft driven by the engine, a sectional shaft parallel to the jack shaft, each section of the last named shaft being connected to one of the driving wheels, a clutch sleeve mounted to turn freely on the sectional shaft, sprocket wheels and a sprocket chain operatively connecting said sleeve with the jack shaft, a pair of gear wheels mounted to turn loosely on the sectional shaft, a pair of gear wheels fast on the jack shaft meshing with and driving the gear wheels on the sectional shaft, and clutch devices adapted to connect each section of the sectional shaft to either the clutch sleeve or one of the driven gear wheels.

In testimony whereof, I affix my signature in presence of witnesses.

WILLIAM N. SPRINGER.

Witnesses:
CHAS. B. McDOUGAL,
R. H. RADLEY,
ETHEL FOREMAN.